United States Patent [19]

Etzel et al.

[11] 4,299,492
[45] Nov. 10, 1981

[54] LASER MEASURING SYSTEM FOR INCREMENTAL ASSEMBLIES

[75] Inventors: John G. Etzel, Rockville, Md.; James A. Munford, Fulton, Md.

[73] Assignee: The United States of America as represented by the Administrator of the National Aeronautics and Space Administration, Washington, D.C.

[21] Appl. No.: 102,001

[22] Filed: Dec. 7, 1979

[51] Int. Cl.³ .................. G01B 11/10; G01B 9/02
[52] U.S. Cl. .................................. 356/386; 356/349
[58] Field of Search .............. 33/125 C; 356/386, 387, 356/373, 349

[56] References Cited

U.S. PATENT DOCUMENTS 3,656,853  4/1972  Bagley et al. ................. 356/349
3,778,167 12/1973  Claret et al. ................. 356/373

Primary Examiner—John K. Corbin
Assistant Examiner—Bruce Y. Arnold

Attorney, Agent, or Firm—John O. Tresansky; John R. Manning; Robert D. Marchant

[57] ABSTRACT

A laser measuring system for incremental assemblies such as wire-wrapped frame assemblies used in spark chambers and the like is disclosed. The system utilizes a laser (10), an interferometer (11) and a retroreflector (12) to precisely measure distance. A light source (17) and a photodetector (18) are located adjacent the incremental assembly and mounted on a movable carriage (13). The interferometer (11) is also mounted on the movable carriage (13), while the laser (10) and retroreflector (12) are positioned at either end of the carriage track. The carriage (13) is moved along one edge of the incremental assembly between the retroreflector (12) and the laser (10), and as the carriage (13) is moved, the light from the light source (17) to the photodetector (18) is interrupted. This produces a trigger command to a control unit (20) which in turn causes a distance measurement to be made. A printout is provided for each sampling trigger command to list such items as ideal position, actual position and amount of error.

10 Claims, 3 Drawing Figures

LASER MEASURING SYSTEM FOR INCREMENTAL ASSEMBLIES

ORIGIN OF THE INVENTION

The invention described herein was made by employees of the United States government and may be manufactured and used by or for the government for governmental purposes without the payment of royalties thereon or therefor.

TECHNICAL FIELD

This invention generally relates to laser measuring systems and more particularly to a laser system for automating the measurement of incremental assemblies.

As a specific example of an incremental assembly which can be accurately measured by the system according to the invention, a wired grid frame assembly composed of small diameter wires which is the basic component of a spark chamber will be considered. Spark chambers are used for measuring the energy and direction of ionizing radiation and may comprise forty to fifty wired grid frames forming a cubic grid at the bottom of which is a scintillation crystal that absorbs the radiation and emits secondary radiation for detection by photo-multiplier tubes. Each frame has a square opening which may measure, for example, 81 by 81 cm with two planes of 992 parallel and evenly spaced wires on two mutually perpendicular planes, the two planes being separated by 4 mm. Each wire on the frame is associated with circuitry which records the current generated by the ionizing radiation. The wire wound on the frame assembly is made from 0.076 mm (or 0.003 inch) diameter Be-Cu wire stock.

BACKGROUND ART

Prior to the present invention, the grid wires on the frame assemblies were measured manually with a standard optical theodolite instrument. This procedure is very tedious for the inspector, and visual fatigue becomes a prime factor on the quality of inspection. Using this procedure, approximately fifty man-hours were required to inspect one frame assembly.

It is therefore an object of the invention to provide a system for automating the measurement of incremental assemblies.

It is another object of this invention to provide a highly accurate laser measuring system for incremental assemblies such as wire wrapped frames and the like.

It is a further object of the invention to provide a system for measuring and recording distances in incremental assemblies in a fast and accurate manner.

STATEMENT OF INVENTION

The foregoing and other objects are attained by using a laser, an interferometer and retroreflector to precisely measure distance. A light source and a photodetector are located adjacent the incremental assembly and mounted on a movable carriage. The interferometer is also mounted on the movable carriage, while the laser and retroreflector are positioned at either end of the carriage track. The carriage is moved along one edge of the incremental assembly between the retroreflector and the laser, and as the carriage is moved, the light from the light source to the photodetector is interrupted. This produces a trigger command to a control unit which in turn causes a distance measurement to be made. A printout is provided for each sampling trigger command to list such items as ideal position, actual position and amount of error.

BRIEF DESCRIPTION OF DRAWINGS

The specific nature of the invention, as well as other objects, aspects, uses and advantages thereof, will clearly appear from the following description with reference to the accompanying drawings in which.

DETAILED DESCRIPTION OF THE INVENTION

Figure 1:
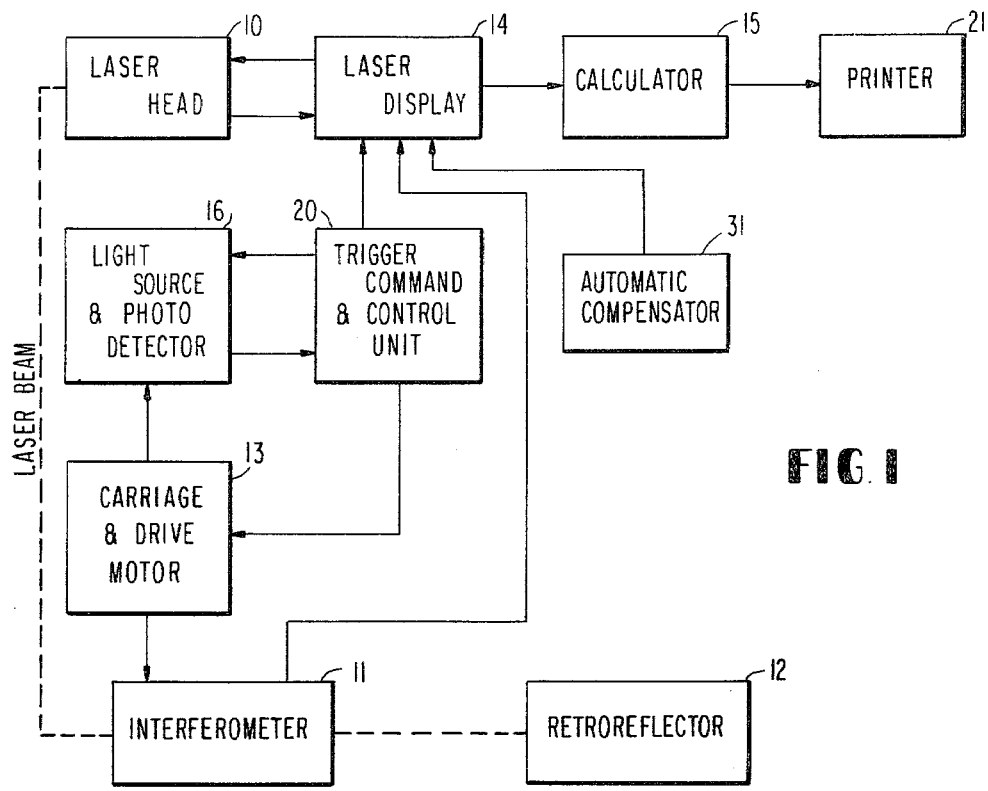
FIG. 1 is a block diagram of the laser measuring system according to the invention.

Referring now to the drawings, and more particularly to FIG. 1, a laser head 10 produces a coherent beam of light which is directed toward an interferometer 11 and a retroreflector 12 lying on a common line. The laser head 10 may be, for example, a helium-neon gas laser. The laser head 10 and the retroreflector 12 are fixedly mounted on pedestals at either end of a carriage track (not shown) on which there is mounted a motor driven carriage 13. The interferometer 11 is mounted on and movable with the carriage between the retroreflector 12 and the laser head 10. It will be appreciated that, while the figure shows the laser beam as having a two-dimensional path with two right angle bends, the laser beam in fact has a linear path. When there is relative movement between the interferometer 11 and the retroreflector 12, the return light to the interferometer will be Doppler shifted. This return light is directed to Doppler detectors and amplified to provide a Doppler signal for the laser display unit 14. The reference signal from the laser head 10 and the Doppler signal from the interferometer 11 are converted to logic pulses by the laser display 14, and these logic pulses are applied to the calculator 15. As a specific example of components which may be used in the laser distance measuring system, the laser head 10 may be a Hewlett Packard model 5500C, the interferometer may be a Hewlett Packard model 10565B, the retroreflector 12 may be a Hewlett Packard 10550B, the laser display 14 may be a Hewlett Packard model 5505A, and the calculator may be a Hewlett Packard model 9815A. Since these components are all commercially available components and their operations are well documented by the manufacturer, no further discussion will be given of the details of the construction and operation of the laser distance measuring system used in the practice of the invention.

Figure 2:
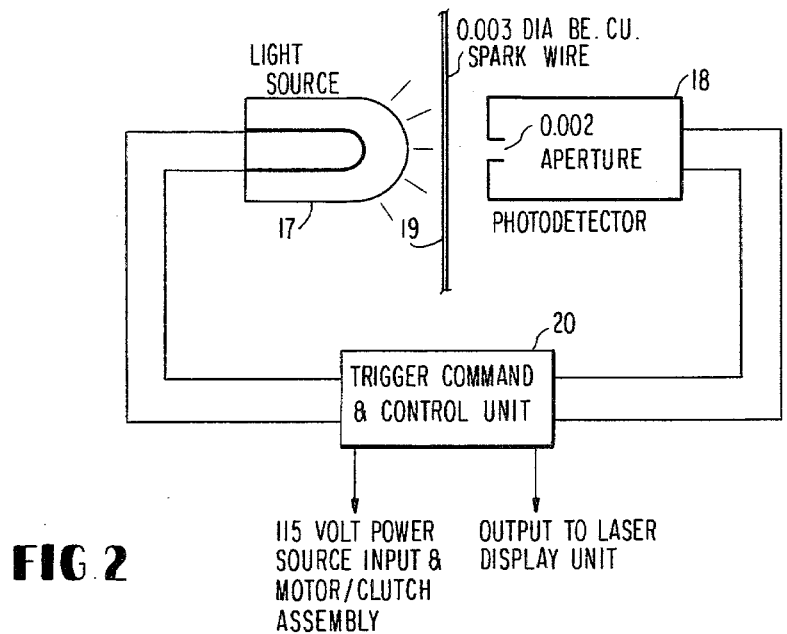
FIG. 2 is a detailed block diagram showing the photodetector and light source assembly.

Located on the carriage 13 is a light source and photodetector 16 shown in more detail in FIG. 2. In the preferred embodiment, the light source 17 and photodetector 18 are located on either side of the wires 19 of the frame assembly. The light source 17 may be a General Electric model 222 light source, and the photodetector 18 may be a Fairchild model FPT 110 photodetector. The photodetector 18 is masked to provide a 0.051 mm aperture which is smaller than the 0.076 mm diameter of the Be-Cu wire used in the spark chamber frame of the specific example. As the light source 17 moves past a wire 19, the light to the photodetector 18 is blocked by the wire, causing a voltage drop on the phototransistor of the photodetector. This voltage drop generates a trigger pulse in the trigger command and control unit 20. The trigger command and control unit triggers the command circuit of the laser display 14, and the external print command and external pause command signals are generated by the laser display 14. The external pause command is used to register the distance between wires to the output stage of calculator 15. The subsequent external print command initiates a printout cycle to the calculator 15. The printer 21 prints out the wire number, the ideal position, actual position, and amount of error for each wire as illustrated in Table 1 below:

TABLE 1

| FILE CODE | | 101 | | |
|---|---|---|---|---|
| SPACING | = | 0.0320 | | |
| TOL | = | 0.0015 | | |
| POSN | = | 3.5250 | | |
| FLG | WIRE NO. | IDEAL POSITION | ACTUAL POSITION | ERROR |
| | 1 | 3.5250 | 3.5257 | 0.0007 |
| | 2 | 3.5570 | 3.5581 | 0.0011 |
| | 3 | 3.5890 | 3.5900 | 0.0010 |
| | 4 | 3.6210 | 3.6218 | 0.0008 |
| | 5 | 3.6530 | 3.6540 | 0.0010 |
| | 6 | 3.6850 | 3.6858 | 0.0008 |
| | 7 | 3.7170 | 3.7174 | 0.0004 |
| | 8 | 3.7490 | 3.7497 | |

Where an error exceeds the tolerance, the wire is flagged as illustrated in Table 2 below:

TABLE 2

| @ | | | | |
|---|---|---|---|---|
| FILE CODE | | 0 | | |
| SPACING | = | 0.0320 | | |
| TOL | = | 0.0015 | | |
| POSN | = | 3.5250 | | |
| FLG | WIRE NO. | IDEAL POSITION | ACTUAL POSITION | ERROR |
| ### | 1 | 3.5250 | 3.5223 | −0.0027 |
| ### | 2 | 3.5570 | 3.5547 | −0.0023 |
| ### | 3 | 3.5890 | 3.5870 | −0.0020 |
| ### | 4 | 3.6210 | 3.6190 | |

In addition to the foregoing, the distance of travel corresponding to each sampling can also be automatically printed out by the printer 21. A specific example of a printer which may be used is the Teletype Corp. model 33 printer.

Figure 3:
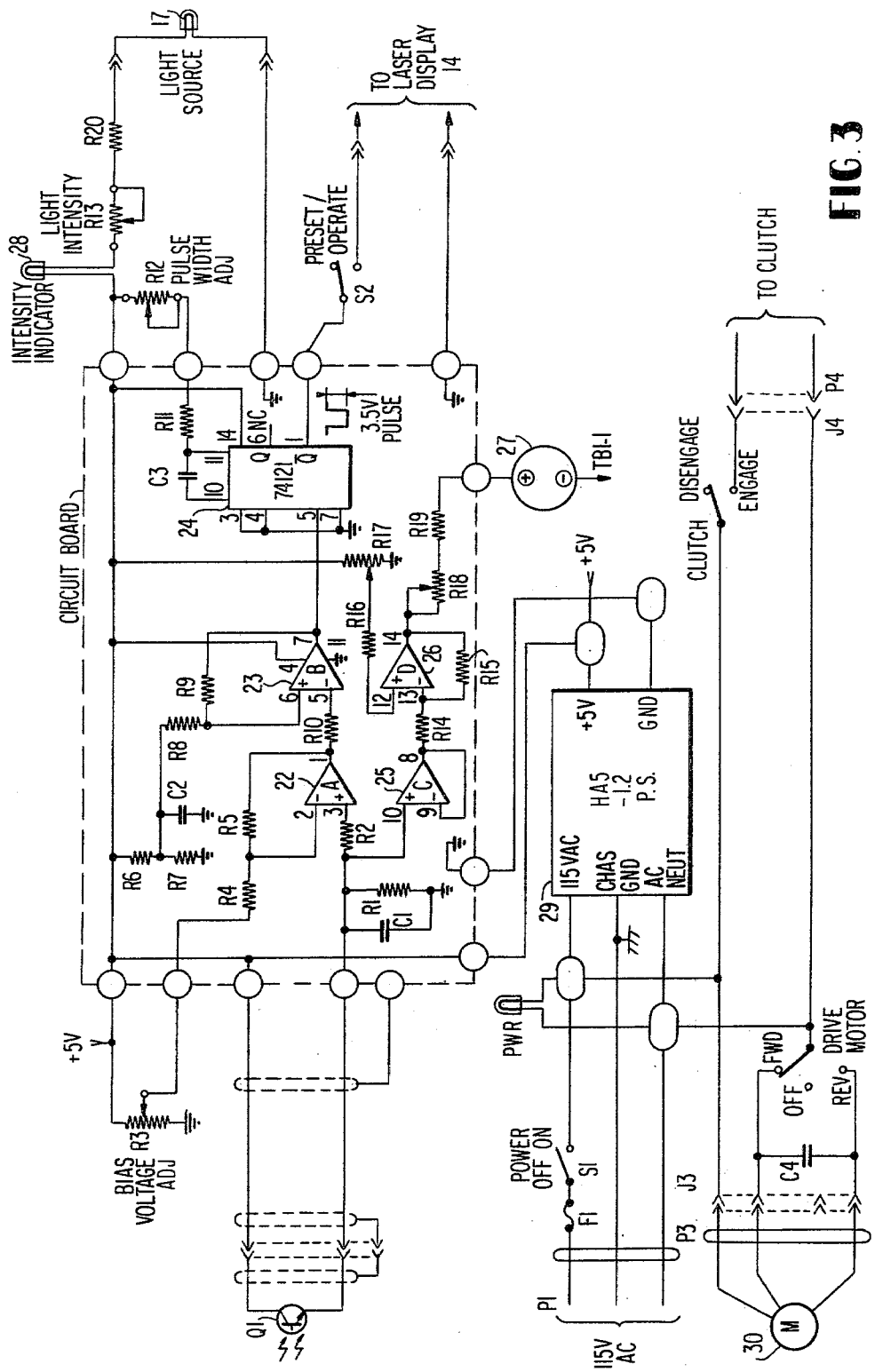
FIG. 3 is a schematic and block diagram of the trigger command and control unit of the system shown in FIG. 1.

The trigger command and control unit 20 is shown in more detail in FIG. 3. The phototransistor Q1 of the photodetector has its collector connected to a positive five volt regulated supply and its emitter connected to the non-inverting input of signal amplifier 22 through series resistor R2. A bias voltage is supplied to the inverting input of amplifier 22 by an adjustable potentiometer R3 connected across the five volt regulated supply and a resistor R4. A feedback resistor R5 is connected between the output and the inverting input of amplifier 22, while a parallel RC network consisting of resistor R1 and capacitor C1 is connected between the emitter of transistor Q1 and common. The output of amplifier 22 is connected through series resistor R10 to the inverting input of an amplifier 23 connected as a Schmitt trigger. The threshold voltage for the Schmitt trigger is established by a voltage divider consisting of resistors R6 and R7 connected to the five volt regulated supply. A capacitor C2 is connected across resistor R7, and the junction of resistors R6 and R7 is connected to the non-inverting input of the Schmitt trigger 23 through a series resistor R8. A feedback resistor R9 is connected between the output and the non-inverting input of the Schmitt trigger. The output of the Schmitt trigger is supplied to a pulse shaping circuit 24 which provides an output trigger pulse to the laser display 14. The pulse shaping circuit 24 may be a monostable multivibrator which is provided with a pulse width determining RC circuit comprising capacitor C3 and resistor R11. By connecting potentiometer R12 in series with resistor R11 and the five volt regulated supply, the pulse width may be adjusted.

The emitter of transistor Q1 is also connected to the non-inverting input of amplifier 25 which has its output directly connected to its inverting input. Therefore, amplifier 25 acts as a voltage follower. The output of amplifier 25 is connected through series resistor R14 to the inverting input of amplifier 26. Negative feedback for amplifier 26 is provided by resistor R15. A bias voltage is supplied to the non-inverting input of amplifier 24 by means of potentiometer R17 and series resistor R16. The output of amplifier 26 is connected through series adjustable resistor R18 and resistor R19 to the positive terminal of a milliammeter 27. The voltage follower 25 and inverting amplifier 26 are used to peak the meter 27 as soon as an output is provided by transistor Q1 to indicate the wire position.

The light source 17 is supplied with current from the five volt regulated supply through the series connection of an intensity indicator lamp 28, variable resistor R13 and resistor R20. The five volt regulated supply 29 is itself supplied from a 115 VAC source. The motor 30 and its associated clutch for the carriage 13 are also supplied from the 115 VAC source.

In one working embodiment of the invention, the following values for the various circuit components were used. The listing of these values is by way of example only and is not meant to limit the scope of the invention in any manner.

| R1 | 51K | R13 | 100Ω |
|---|---|---|---|
| R2 | 51K | R14 | 10K |
| R3 | 10K | R15 | 10K |
| R4 | 51K | R16 | 5.1K |
| R5 | 2.2M | R17 | 1K |
| R6 | 2.2K | R18 | 1K |
| R7 | 2.2K | R19 | 470Ω |
| R8 | 51K | R20 | 22Ω |
| R9 | 150K | C1 | .22µf |
| R10 | 36K | C2 | 10µf 10V |
| R11 | 9.1K | C3 | 33µf |
| R12 | 100K | C4 | .5µf 400V |
| 22 23 25 26 | } each ¼ LM324 manufactured by National Semiconductor | | |
| 24 | 74121 manufactured by National Semiconductor | | |
| 29 | HA5 manufactured by Power One, Inc. | | |
| 27 | 0–1 Milliammeter | | |

While the preferred embodiment has been described in terms of one specific example, it is possible to make various modifications in the system without departing from the spirit of the invention. For example, it is possible to locate the light source and photodetector on the same side of the wire plane by using reflected light. Such a modification would of course require modification of the trigger command and control unit circuit, but such modification is within the skill of the art and will not be further described. Further, as shown in FIG. 1, an automatic compensator 31 may be provided for the laser display 14 to increase the accuracy of the measurements. The automatic compensator automatically and continuously corrects the laser display for air conditions and, when desired, material temperatures. The compensator has an air temperature sensor, humidity sensor, and a barometer. The compensator may be a Hewlett Packard model 5510A. Other modifications, adaptions and uses of the invention will readily suggest themselves to those skilled in the art.

We claim:

1. A laser measuring system for measuring an incremental assembly, said laser measuring system comprising:
    a laser and a retroreflector for positioning adjacent opposite edges of said incremental assembly,
    an interferometer movable along a line between said retroreflector and said laser,
    laser display means connected to said interferometer for converting an output from said interferometer into a distance indicating signal in response to a control signal,
    detecting means movable with said interferometer for detecting incremental positions of said incremental assembly along said line, and
    control means responsive to said detecting means for producing said control signal to said laser display means.

2. A laser measuring system as recited in claim 1 further comprising printing means responsive to said laser display means for providing a printout of distance values corresponding to each of said distance indicating signals.

3. A laser measuring system as recited in claim 1 wherein said detecting means comprises a light source and a photodetector.

4. A laser measuring system as recited in claim 3 further comprising a carriage on which is mounted said interferometer, said light source and said photodetector, said carriage being movable along said line between said retroreflector and said laser.

5. A laser measuring system as recited in claim 1 wherein said control means comprises:
    signal amplifying means response to the output of said detecting means for providing an amplified output signal; and
    pulse generating means responsive to said amplified output signal for generating an output pulse which is said control signal.

6. A laser measuring system as recited in claim 5 wherein said pulse generating means comprises a Schmitt trigger and a monostable multivibrator.

7. A laser measuring system as recited in claim 5 further comprising indicating means responsive to the output of said photodetector for indicating the detection of each of said incremental positions.

8. A laser system for measuring an incremental assembly comprising:
    means (10) for projecting a coherent beam of light across an incremental assembly;
    means (12) aligned with said projecting means (10) adjacent said incremental assembly for reflecting said beam of light;
    means (11) disposed within said projected and reflected beam of light and amenable to linear displacement relative to said incremental assembly for causing an interference effect during said linear displacement;
    means (14) receptive to said projecting means (10) and said interference causing means (11) for converting said interference effect into a signal dependent upon said linear displacement upon receipt of a command signal;
    means (16) conjugately displaceable with said interference causing means (11) for detecting incremental features of said assembly; and
    means responsive (20) to said detecting means (16) for providing said command signal to said converting means (14).

9. The laser system of claim 6 wherein said interference causing means (11) is linearly displaceable along said projected and reflected beam.

10. The laser measuring system of claims 6 or 9 wherein said providing means (20) comprises:
    signal amplifying means (22) responsive to the output of said detecting means (11) for providing an amplified output signal; and
    pulse generating means (23, 24) responsive to said amplified output signal for generating said control signal.

* * * * *